United States Patent [19]
Lin

[11] Patent Number: 5,977,680
[45] Date of Patent: Nov. 2, 1999

[54] METHOD FOR TRIMMING THE STATOR OF A MOTOR

[75] Inventor: Yung-Ping Lin, Taoyuan Shien, Taiwan

[73] Assignee: Delta Electronics, Inc., Taoyuan Shien, Taiwan

[21] Appl. No.: 09/148,971

[22] Filed: Sep. 5, 1998

[30] Foreign Application Priority Data

May 15, 1998 [TW] Taiwan ................................. 87107504

[51] Int. Cl.⁶ ....................................................... H02K 1/14
[52] U.S. Cl. ............................ 310/216; 310/218; 310/51; 310/259
[58] Field of Search .................................... 310/216, 269, 310/51, 67 R, 218, 259

[56] References Cited

U.S. PATENT DOCUMENTS

| | | | |
|---|---|---|---|
| 4,280,072 | 7/1981 | Gotou et al. ........................... | 310/67 R |
| 4,882,511 | 11/1989 | Von Der Heide ....................... | 310/67 R |
| 5,442,247 | 8/1995 | Suzuki et al. .......................... | 310/67 R |
| 5,457,350 | 10/1995 | Sakamaki et al. ...................... | 310/216 |

Primary Examiner—Nestor Ramirez
Assistant Examiner—Karl Imayoshi Tamai
Attorney, Agent, or Firm—W. Wayne Liauh

[57] ABSTRACT

An improved method for stator of a motor, which is related to a shape of a stator made of laminated silicon steel in a motor; the prime of the method is to reduce the cogging torque upon the motor running so as to reduce the vibration of motor, and to increase the performance of the motor as well; the result of such method can be used for a stator made of laminated silicon steel in a motor so as to improve the structure of a stator in conventional motor, which used to generate a cogging torque.

2 Claims, 3 Drawing Sheets

METHOD FOR TRIMMING THE STATOR OF A MOTOR

FIELD OF THE INVENTION

This invention relates to an improved method for trimming the tooth of the stator of a motor, and its main point is to improve the shape of the stator made of laminated silicon steel. The pole structures of the armature tooth can effectively reduce the slot effect, the cogging torque, and the vibration phenomenon of a motor, as well as providing a maximum torque output.

BACKGROUND OF THE INVENTION

Generally, the shape of stator made of laminated silicon steel and the ratio of slots (the ratio between the slots and poles) of a conventional motor are similar to each other. Now, a nine-slot stator made of laminated silicon steel in a motor is used as an example for technical description.

Referring to FIG. 1, which is a top view a stator made of laminated silicon steel in a conventional motor, in which both side ends 11 of the armature tooth 1 were not trimmed as shown in FIG. 1. In that case, a slot effect will take place among the teeth thereof when the rotor is turning. The slot effect will result in the taking place of a cogging torque, which can cause a cogging pause; i.e., an unsteady running phenomenon to cause the motor to vibrate during running. Furthermore, the aforesaid phenomenon will worsen when the motor is running under a high frequency condition, wherein the stability of the motor will be reduced considerably.

The aforesaid defects caused by the slot effect can usually be solved by a technical method of magnetization. However, such method of magnetization for improving the cogging torque and other defects is to have the magnetic flux changed to a sine wave form so as to obtain a round and smooth magnetic force for reducing the slot effect.

However, the direct magnetization method is difficult to reduce the slot effect to a minimum or cause it to cease to exist. Furthermore, the magnetizing process is not easy to control. In case even a minor mistake is made, a considerable cogging torque may be reduced, but then the slot effect might become worse. In other words, the method of magnetization for reducing the slot effect needs further improvement.

SUMMARY OF THE INVENTION

This invention relates to an improved shape design of stator made of laminated silicon steel for use in a motor. The main point of the present invention is to change the side end shape of the pole of the armature tooth. By means of a novel trimming method, the curvature of the side ends of the armature tooth can be determined, and then the shape of the side ends can be formed to achieve the purpose of reducing the slot effect.

The prime object of the present invention is to provide a method for changing the shape of a stator made of laminated silicon steel for use in a motor. A motor made using such method can eliminate the cogging torque during operation. Since the present invention can overcome the slot effect, the motor made incorporating the same can run more steadily and smoothly.

Another object of the present invention is to provide the stator of laminated silicon steel with a shape for reducing the vibration phenomenon of a motor during operation so as to have the motor run more steadily.

In order to fulfill the aforesaid objects, the present invention has provided a method to modify the shape of the stator made of laminated silicon steel. Such a method is, in essence, to change the curvature of both side ends of the pole of the armature tooth. The curvature can be determined by using a top point in the side end of armature tooth to draw a circle, which is tangential to the curved edge of the armature tooth.

The aforesaid side end circle of armature tooth is a circle located between the top point of the side ends and the curved edge of the armature tooth, and then the curvature required by the side ends of the armature tooth is formed into shape. By means of the combination of the side ends and the curved edge of the armature tooth, the shape of the armature tooth of a stator made of laminated silicon steel in a motor is optimized according to the present invention.

In order to facilitate examining the present invention in terms of objects, features and effectiveness thereof, a detailed description accompanying with drawings will be given in the following paragraphs.

DETAILED DESCRIPTION OF THE EMBODIMENT

This invention relates to a method to improve the shape of stator made of laminated silicon steel for use in a motor. Such method is to be performed by trimming both side ends of an armature tooth into different angles as desired. According to the present invention, the shape of each armature tooth of the stator in a motor can have the slot effect reduced so as to lower the extent of vibration of the motor during operation.

Figure 1:
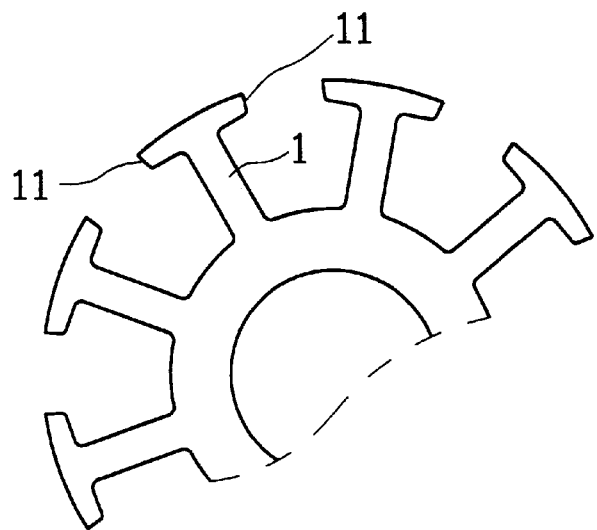
FIG. 1 is a top view of a conventional stator of a motor made of laminated silicon steel.
Figure 2:
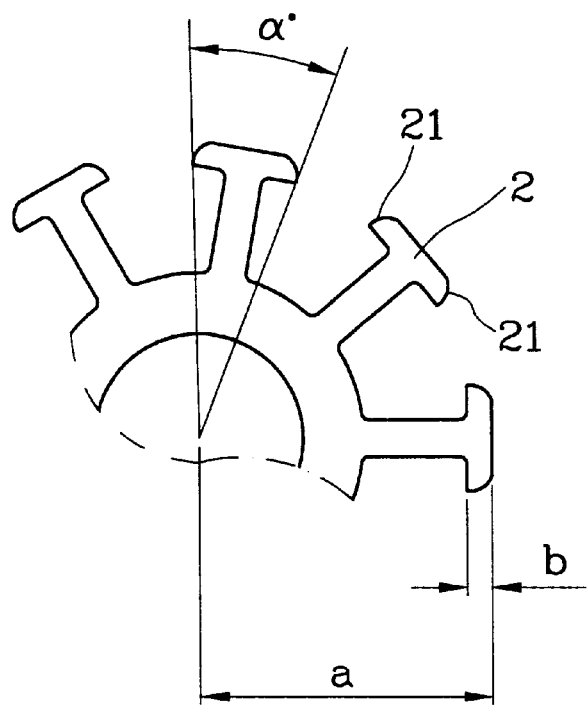
FIG. 2 is a top view of a stator of a motor made of laminated silicon steel according to embodiment-1 of the present invention.

Referring to FIG. 2, which shows the top view of the stator of a motor made of laminated silicon steel according to the embodiment-1 of the present invention. The stator has nine slots and nine armature teeth 2. Both side ends 21 of the pole 3 of each armature tooth 2 are formed into a curved part. The pole portion 3 is perpendicular to the stem portion 4 of the same armature tooth 2. Greek letter "α" stands for the containment angle of the armature tooth 2; "a" stands for the radius of each armature tooth, i.e., the distance between the top of the armature tooth and the center of the stator made of laminated silicon steel; and "b" stands for the width of the top end of armature tooth 2.

The curved part on both side ends 21 of the pole of the armature tooth 2 is the main point of the present invention, which discloses a novel method to determinate the curve on both side ends 21. By means of such method, an optimized curve can be determined under a given condition. For further describing the method of trimming the curve on tooth side ends 21, a detailed description accompanying with FIG. 3 is given below.

Figure 3:
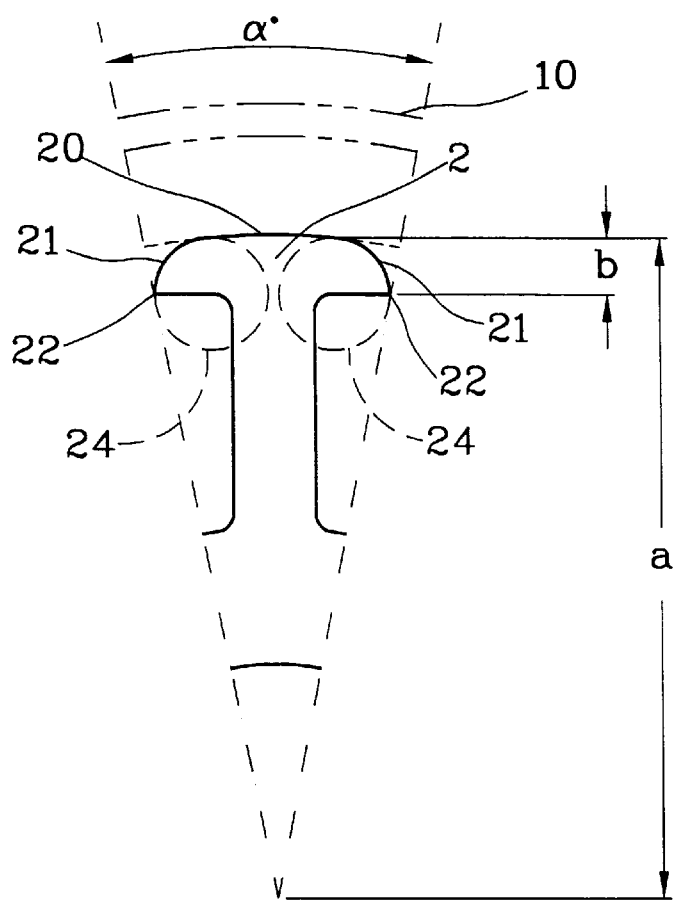
FIG. 3 is a fragmental view of an armature tooth according to embodiment-1, showing the trimmed curve on both side ends of the armature tooth.

Referring to FIG. 3, it shows the method of trimming the curve on both side ends of the armature tooth in embodiment-1 of the present invention. A rotor curve 10 is also shown in FIG. 3. A curved edge 20 of the armature tooth is also shown in concentric circle manner with the rotor curve 10. The curve edge 20 is used for determining the shape of top of the armature tooth 2. The two side ends 21 of the armature tooth 2 are considered the essential point of the present invention. The curvature of the side ends 21 can be determined by the method according to the present invention.

Each of the two side ends of the armature tooth 2 has a top point 22. According to the method of deterring the curvature of the side end 21, the top point 22 is a part of a circle, and such circle is the side end circle 24 of the armature tooth as shown in FIG. 3. The side end circle 24 is at a tangent relative to the curved edge 20 of the armature tooth. The tangential relation thereof is used for determining the size of the side end circle 24, which is located between the top point 22 and the curved edge 20, and the side end 21 is formed along the circle 24. In other words, the curvature of the side end circle 24 is the curvature of the side end 21 of the armature tooth, and such relation can be expressed with the equation as follows:

$$Rmin = \frac{b^2 - 2ab + (a-b)^2 \tan^2 \frac{\alpha}{2}}{2\left[(a-b)\tan\frac{\alpha}{2} - a\right]} \leq R < \frac{b^2 + (a-b)^2 \tan^2 \frac{\alpha}{2}}{2b} = Rmax \quad \text{Eqn. 1}$$

In the aforesaid equation-1, R stands for trimmed parameter (i.e., the radius of the circle tangential to the curved edge 20), Rmin stands for the minimum trimmed parameter, and Rmax stands for the maximum parameter; it is apparent that the relation between the trimmed parameter and the contained angle α, and the relation between the radius "a" and the thickness of the armature tooth are in proportional relation, i.e., the value of a R can be calculated by using the reference values of α, a and b.

Another meaning of Rmin is that, when drawing the side end circle 24, the curvature of the side end 21 is a portion of the minimum circle drawn. Likewise, the Rmax means the curvature of the side end 21 is a portion of the maximum circle drawn. In other words, as long as the curvature of the trimmed parameter R is satisfied, the cogging torque will be reduced effectively. On the aforesaid point, the inventor has made actual experiments for different curvatures of side end 21 to result different cogging torques, which are shown with a curve diagram as shown in FIG. 5.

Figure 4:
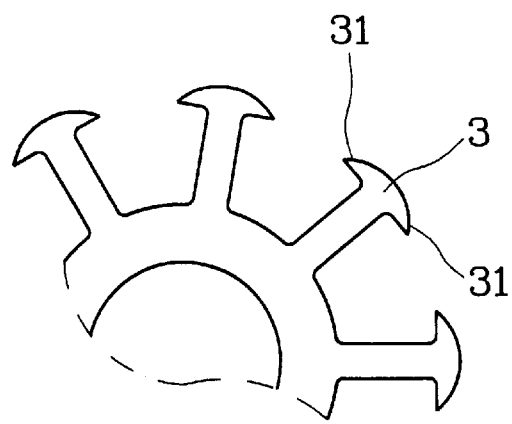
FIG. 4 is a top view of a stator made of laminated silicon steel in a motor according to embodiment-2 of the present invention.
Figure 5:
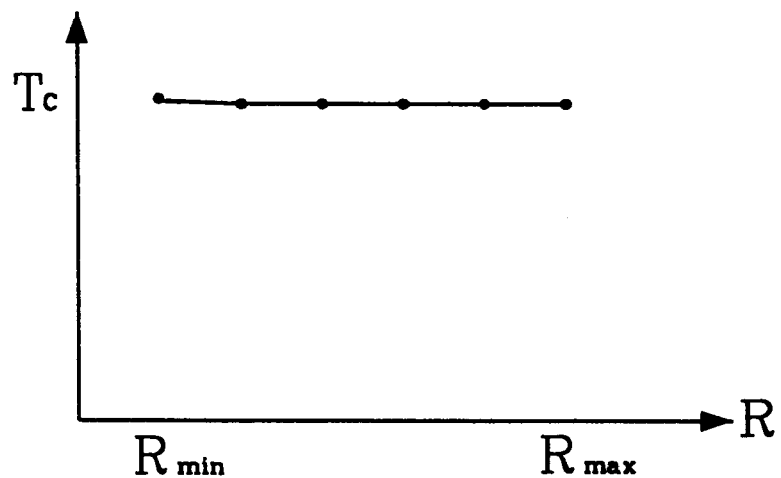
FIG. 5 is a curve diagram according to the embodiment of the present invention, showing the pausing torque to be reduced under different curves tired.

FIG. 5 shows that the different curvatures trimmed according to the formula described above result in the cogging torques being reduced effectively. In FIG. 4, Tc stands for cogging torque. A plurality of data points between Rmin and Rmax were selected as samples for comparison. There are four points in FIG. 5, representing different curvatures of the side ends 21 for reference and comparison. Results in FIG. 5 show that the cogging torque Tc at different curvatures are very similar. i.e., as long as the curvatures are trimmed on the side ends 21 of armature tooth meet the requirements of equation 1, the cogging torque will be reduced effectively to have the slot effect reduced as well; in that case, the motor can ran smoothly and steadily.

According to the condition of equation 1, the present invention has provided an embodiment-2, in which the stator made of laminated silicon steel has a new shape as shown in FIG. 4. FIG. 4 shows a top view of the stator according to the embodiment-2, which includes nine slots and nine armature teeth 3. The curvature of the two side ends of the armature tooth 3 is trimmed and drawn in accordance with the method as shown in FIG. 3, and the trimmed parameters R will satisfy the condition required of equation 1. However, the embodiment-2 is made under the condition of the side end circle 24 being the maximum circle (i.e., Rmax); therefore, the embodiment-2 can also improve the defects of the prior art effectively.

Figure 6:
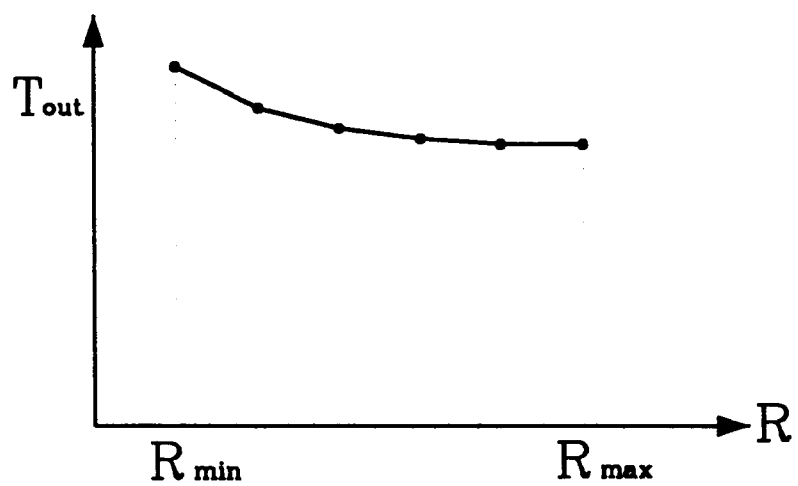
FIG. 6 is a curve diagram according to the embodiment of the present invention, showing different output torsions of the motor under different curves trimmed.

However, the inventor has made a comparison between the embodiment-1 and embodiment-2 in terms of motor-running effectiveness under the condition of a same operation current to provide different torque output. FIG. 6 shows the relation between different curvatures trimmed and the torque output. In FIG. 6, Tout stands for torque output. Now, a plurality of sample points are selected between the minimum trimmed parameter and the maximum trimmed parameter. As shown in FIG. 6, the smaller the trimmed parameter is (i.e., the minimum trimmed parameter Rmin), the bigger the torque output will be. In terms of the running effectiveness of a motor, the motor will minimum trimmed parameter Rmin is much better than a motor with maximum trimmed parameter Rmax. Although a motor with minimum trimmed parameter Rmax or a motor with maximum trimmed parameter Rmax can reduce the cogging torque, a motor with minimum turned parameter Rmin is superior to a motor with maximum trimmed parameter in terms of torque output thereof, i.e., the embodiment-1 is superior to the embodiment-1 embodiment-2 of the present invention, and therefore the embodiment-1 is the preferred embodiment.

Through comparison between FIG. 5 and FIG. 6, it is apparent that a motor can be designed to have a lower cogging torque and a higher torque output on condition that has the best trimmed parameter R, which can be obtained with equation 2 as follows:

$$R = Rmin = \frac{b^2 - 2ab + (a-b)^2 \tan^2 \frac{\alpha}{2}}{2\left[(a-b)\tan\frac{\alpha}{2} - a\right]} \quad \text{Eqn. 2}$$

According to the embodiment of the present invention, different sizes of containment angle α can be selected in order to obtain a better torque output for a motor; a preferred motor rpm may also be obtained by selecting different sizes of containment angle α; therefore, a user may design the containment angle a within a given scope so as to have a motor bad a higher torque output and rpm.

According to the comparison between FIG. 5 and FIG. 6, a preferred embodiment for a stator of a motor can be obtained on condition that the curvature of both side ends 21 of the armature tooth is selected with the minimum trimmed parameter R; by means of the aforesaid condition, the preferred ratio of slots to poles of a motor is 3:4; such a design not only can reduce the cogging torque for reducing the slot effect, but also can maintain or increase the performance of a motor.

According to the aforesaid improved method for the stator of a motor, a trimmed parameter R for the shape of the stator made of laminated silicon steel can be obtained so as to find a preferred curvature of the side ends of armature tooth and to reduce the cogging torque in order to reduce the slot effect and the vibration phenomenon of motor and to increase the motor performance. It is apparent that the object and effectiveness of the present invention are deemed practical and novel, and having industrial value. The present invention is never shown by anyone so far, and therefore it is deemed conforming to the requirements of filing a patent application.

However, the aforesaid description is merely a preferred embodiment of the present invention, and it should not construed as a limit of carrying out the present invention; any change and modification according to the claims of the present invention by anyone is considered within the scope of the claims thereof.

What is claimed is:

1. A stator for use in a motor comprising a plurality of armature teeth radiating from a stator center, each of said armature teeth comprises:

(a) a pole portion having two side ends, said pole portion being substantially perpendicular to a stem portion of said armature tooth;
   (b) a curved edge at an outer edge of said pole portion, said curved edge being part of a first circle which is centered at said stator center;
   (c) wherein each of said side ends is trimmed such that it becomes part of a second circle which is tangential to said first circle, further wherein said second circle having a radius which satisfies the following equation:

$$Rmin = \frac{b^2 - 2ab + (a-b)^2\tan^2\frac{\alpha}{2}}{2\left[(a-b)\tan\frac{\alpha}{2} - a\right]} \leq R < \frac{b^2 + (a-b)^2\tan^2\frac{\alpha}{2}}{2b} = Rmax;$$

where R is the radius of the second circle, Rmin stands for a minimum value of R, Rmax stands for a maximum value of R, $\alpha$ stands for the containment angle of said armature tooth which is the angle formed between to side ends of said pole and said stator center, a stands for the radius of each armature tooth measured from said stator center to said curved edge, and b stands for a width of said pole portion.

2. The stator for use in a motor according to claim 1 wherein said second circle having a radius which satisfies the following equation:

$$R = Rmin = \frac{b^2 - 2ab + (a-b)^2\tan^2\frac{\alpha}{2}}{2\left[(a-b)\tan\frac{\alpha}{2} - a\right]}$$

* * * * *